(12) United States Patent
Uchiyama et al.

(10) Patent No.: US 9,221,375 B2
(45) Date of Patent: Dec. 29, 2015

(54) SEAT STRUCTURE FOR VEHICLE

(71) Applicant: HONDA MOTOR CO., LTD., Tokyo (JP)

(72) Inventors: Hajime Uchiyama, Wako (JP); Hiroyuki Nishimori, Wako (JP); Takeshi Kamiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/225,470

(22) Filed: Mar. 26, 2014

(65) Prior Publication Data

US 2014/0292044 A1 Oct. 2, 2014

(30) Foreign Application Priority Data

Mar. 29, 2013 (JP) ................................. 2013-072892

(51) Int. Cl.
*B60N 3/02* (2006.01)
*B60N 2/01* (2006.01)
*B60N 2/24* (2006.01)
*B60N 2/64* (2006.01)

(52) U.S. Cl.
CPC .. *B60N 3/02* (2013.01); *B60N 2/01* (2013.01); *B60N 2/24* (2013.01); *B60N 2/646* (2013.01)

(58) Field of Classification Search
CPC .................................... B60N 2/01; B60N 3/02
USPC ...................................... 297/183.9; 296/1.02
See application file for complete search history.

(56) References Cited

U.S. PATENT DOCUMENTS

| 3,774,968 | A | * | 11/1973 | Fenton | 297/452.61 |
| 4,529,249 | A | * | 7/1985 | Ino | 297/474 |
| 4,813,738 | A | * | 3/1989 | Ito | 297/180.12 |
| 7,249,798 | B2 | | 7/2007 | Saito et al. | |
| 2007/0132214 | A1 | * | 6/2007 | Suzuki et al. | 280/730.1 |
| 2009/0001761 | A1 | * | 1/2009 | Yasuhara et al. | 296/193.07 |
| 2010/0032976 | A1 | * | 2/2010 | Yamashita et al. | 296/24.3 |

FOREIGN PATENT DOCUMENTS

FR 2680734 * 3/1993
JP 2013-43541 * 3/2013

* cited by examiner

*Primary Examiner* — Dennis H Pedder
(74) *Attorney, Agent, or Firm* — Birch, Stewart, Kolasch & Birch, LLP

(57) ABSTRACT

A vehicle having a single seat for a plurality of occupants sitting side by side in a lateral direction of the vehicle. The seat has a front end recessed rearwardly at a center seat portion so as to form a substantially U-shaped recess as viewed in a plan view. The recess is composed of a bottom portion and a pair of left and right side portions extending obliquely in a forward direction from the left and right ends of the bottom portion. At a left corner portion of a right seat portion where the right side portion of the recess intersects the front end of the right seat portion, there is provided a seat grip for gripping by the occupant sitting on the right seat portion. The occupant can easily grip the seat grip with his/her hand in the vicinity of his/her body, thereby obtaining good support for the body.

11 Claims, 8 Drawing Sheets

SEAT STRUCTURE FOR VEHICLE

CROSS-REFERENCE TO RELATED APPLICATIONS

The present application claims priority under 35 USC 119 to Japanese Patent Application No. 2013-072892 filed Mar. 29, 2013 the entire contents of which are hereby incorporated by reference.

BACKGROUND OF THE INVENTION

1. Field of the Invention

The present invention relates to a seat structure for a vehicle. More particularly to a seat structure having an improved grip for a passenger.

2. Description of Background Art

A suitable grip for a passenger is provided in a vehicle. See, for example, FIG. 9 in U.S. Pat. No. 7,249,798.

As shown in FIG. 9 of U.S. Pat. No. 7,249,798, a left-hand drive vehicle (1) (reference numeral in parentheses is the same as that used in U.S. Pat. No. 7,249,798, and the same applies to the following description of the background art) includes a laterally elongated seat (3) at a front portion of the vehicle (1). The seat (3) has a driver's seat for a driver on the rear side of a steering wheel and a passenger's seat for a passenger on the right side of the driver seat in the lateral direction of the vehicle (1). The driver seat is connected with the passenger seat to form the single seat (3) designed so that a plurality of occupants can sit side by side in the lateral direction of the vehicle (1).

The vehicle (1) is a rough-terrain vehicle adapted to be used in a rough terrain. In driving the vehicle (1) in a rough terrain, the driver grips the steering wheel or grips a left frame grip (652) provided on a body frame (60) to thereby support his/her body.

Further, the passenger can grip a right frame grip (652) with his/her one hand. If the passenger can grip another grip located near his/her body, the body can be better supported.

However, when this grip is provided on the seat (3) at a position near the body by using a separate member, the number of parts is increased to cause an increase in cost.

SUMMARY AND OBJECTS OF THE INVENTION

It is accordingly an object of an embodiment of the present invention to provide in a vehicle having a single seat designed so that a plurality of occupants can sit side by side in the lateral direction of the vehicle a technique that can be easily gripped by the occupant's hand near his/her body to thereby obtain good support for the body.

According to an embodiment of the present invention, there is provided a seat structure for a vehicle having a body frame and a single seat provided on the body frame and designed so that a plurality of occupants can sit side by side in the lateral direction of the vehicle. The seat structure includes a seat grip provided on a lower face of the seat and adapted to be gripped by one of the occupants.

According to an embodiment of the present invention, the seat is a three-occupant seat having a left seat portion, a center seat portion, and a right seat portion. One of the left seat portion and the right seat portion is a driver seat and the other is provided with the seat grip.

According to an embodiment of the present invention, the body frame is provided with a frame grip adapted to be gripped by the occupant. The frame grip is adapted to be gripped by one hand of the occupant and the seat grip is adapted to be gripped by the other hand of the occupant.

According to an embodiment of the present invention, a vertical wall rises from a floor toward the seat with a front end of the seat being positioned on the front side of the vertical wall.

According to an embodiment of the present invention, a space is defined between the lower face of the seat and an upper end of the vertical wall with the edge of the seat being adapted to be gripped by the occupant.

According to an embodiment of the present invention, a belt is provided along the left or right side of the center seat portion so as to extend in the longitudinal direction of the vehicle. The belt is adapted to be gripped by the occupant.

According to an embodiment of the present invention, the front end of the seat is locally recessed rearward of the vehicle so as to form a substantially U-shaped recess as viewed in plan in the seat. The seat grip is provided at a corner portion where the recess intersects the front end.

According to an embodiment of the present invention, the recess is formed on the front end of the center seat portion.

According to an embodiment of the present invention, the center seat portion is higher in level than the left seat portion and the right seat portion.

According to an embodiment of the present invention, the seat grip, adapted to be gripped by the occupant, is formed on the lower face of the seat in the vehicle having a single seat designed so that a plurality of occupants can sit side by side in the lateral direction of the vehicle. Since the hand of the occupant can easily reach the lower face of the seat, the occupant can grip the seat grip at a position near his/her body, thereby obtaining good support for the body.

In addition, no separate member is required to provide the seat grip, so that the number of parts can be reduced to thereby reduce the cost.

According to an embodiment of the present invention, the seat is a three-occupant seat having a left seat portion, a center seat portion, and a right seat portion, wherein one of the left seat portion and the right seat portion is a driver's seat and the other is provided with the seat grip. Accordingly, the driver sitting on the driver's seat can grip a steering wheel to thereby support his/her body, whereas the passenger sitting on the other seat can grip the seat grip to thereby support his/her body.

According to an embodiment of the present invention, the body frame is provided with the frame grip adapted to be gripped by the occupant, wherein the frame grip is adapted to be gripped by one hand of the occupant and the seat grip is adapted to be gripped by the other hand of the occupant. Accordingly, the occupant can support his/her body with both hands to thereby obtain better support for the body.

According to an embodiment of the present invention, the vertical wall rises from the floor toward the seat, wherein the front end of the seat is positioned on the front side of the vertical wall. Accordingly, even when the hand of the occupant is lowered to the front end of the seat, the vertical wall does not interfere with the hand of the occupant, so that the occupant can easily grip the seat grip.

According to an embodiment of the present invention, the space is defined between the lower face of the seat and the upper end of the vertical wall, wherein the edge of the seat is adapted to be gripped by the occupant. Accordingly, the hand of the occupant can be inserted into the space, so that no special working to the seat is required in forming the seat grip.

According to an embodiment of the present invention, the belt is provided along the left or right side of the center seat portion so as to extend in the longitudinal direction of the vehicle, wherein the occupant sitting on the center seat portion can grip the belt and the occupant sitting on the right seat portion can grip the seat grip, thereby obtaining good posture of all the occupants.

According to an embodiment of the present invention, the front end of the seat is locally recessed rearward of the vehicle so as to form the substantially U-shaped recess as viewed in plan, wherein the seat grip adapted to be gripped by the occupant is provided at the corner portion where the recess intersects the front end of the seat. Accordingly, even in the case of a single seat designed so that a plurality of occupants can sit side by side in the lateral direction of the vehicle, the occupant can grip the seat grip in a condition wherein his/her hand is lowered without being twisted. As a result, the occupant can easily grip the seat grip with his/her hand in the vicinity of his/her body, thereby obtaining good support for the body.

In addition, the belt is provided along the left or right side of the center seat portion so as to extend in the longitudinal direction of the vehicle, and the recess has a bottom portion and a pair of left and right side portions extending in a forward direction from the bottom portion, wherein the belt is located at the left or right end of the bottom portion. Accordingly, the belt is blocked by the left or right side portion of the recess to thereby suppress the lateral movement of the belt. As a result, the wearing of the belt on the seat can be reduced to thereby improve the durability of the belt.

According to an embodiment of the present invention, the seat is a three-occupant seat having a left seat portion, a center seat portion, and a right seat portion, wherein the recess is formed on the front end of the center seat portion. Accordingly, the left seat portion and the right seat portion are spaced from each other, so that the sizes of the left seat portion and the right seat portion can be set large. As a result, the left seat portion and the right seat portion can be enlarged in size to thereby improve the comfort in the case wherein two occupants sit on the left and right seat portions.

According to an embodiment of the present invention, the center seat portion is higher in level than the left seat portion and the right seat portion. Accordingly, the occupant sitting on the center seat portion is higher in level than the occupants sitting on the left seat portion and the right seat portion, so that interference between the adjacent occupants can be reduced. As a result, the comfort can be improved in the case wherein three occupants sit on the left, center, and right seat portions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

DETAILED DESCRIPTION OF THE PREFERRED EMBODIMENTS

Figure 1:
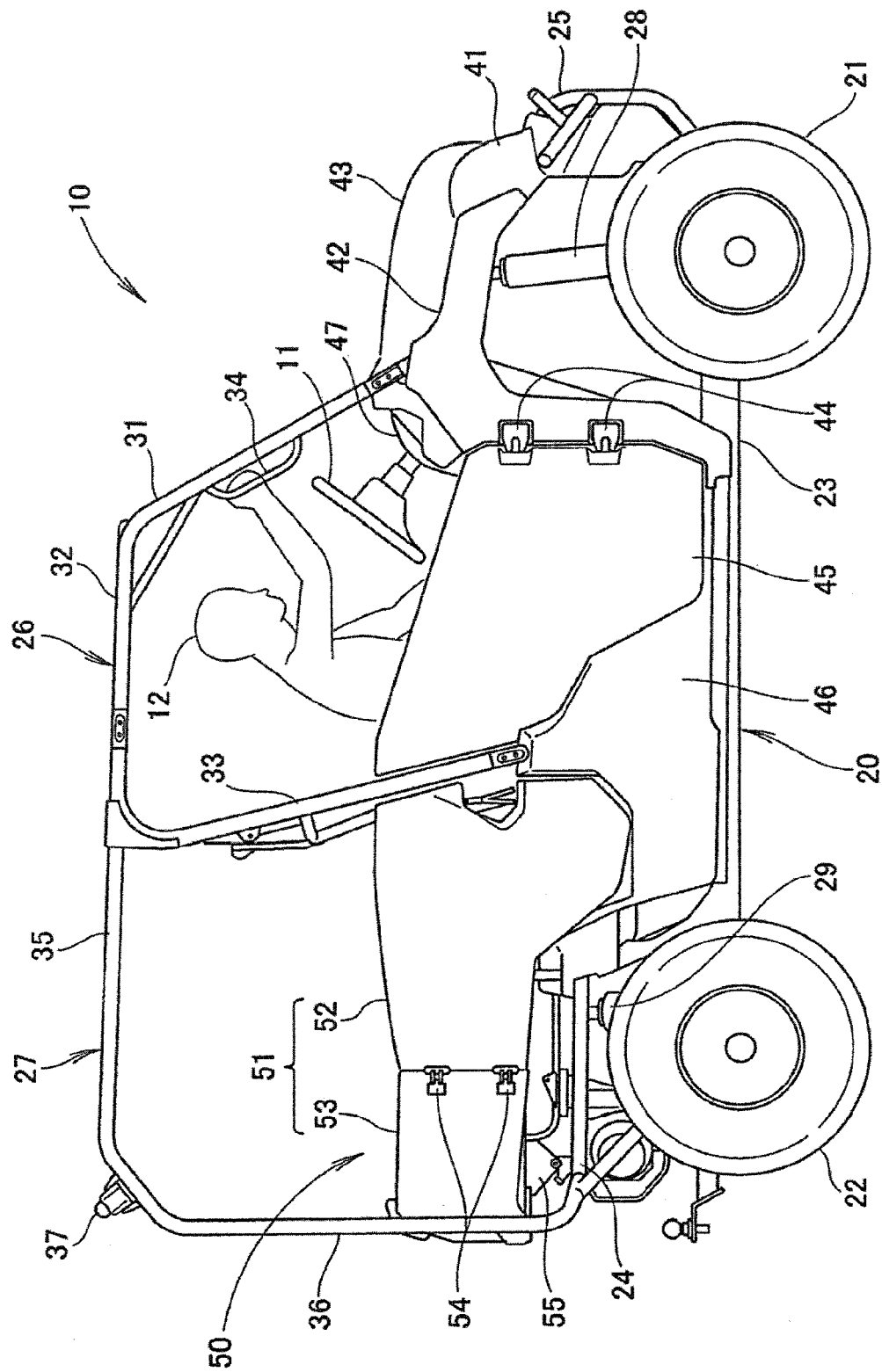
Figure 2:
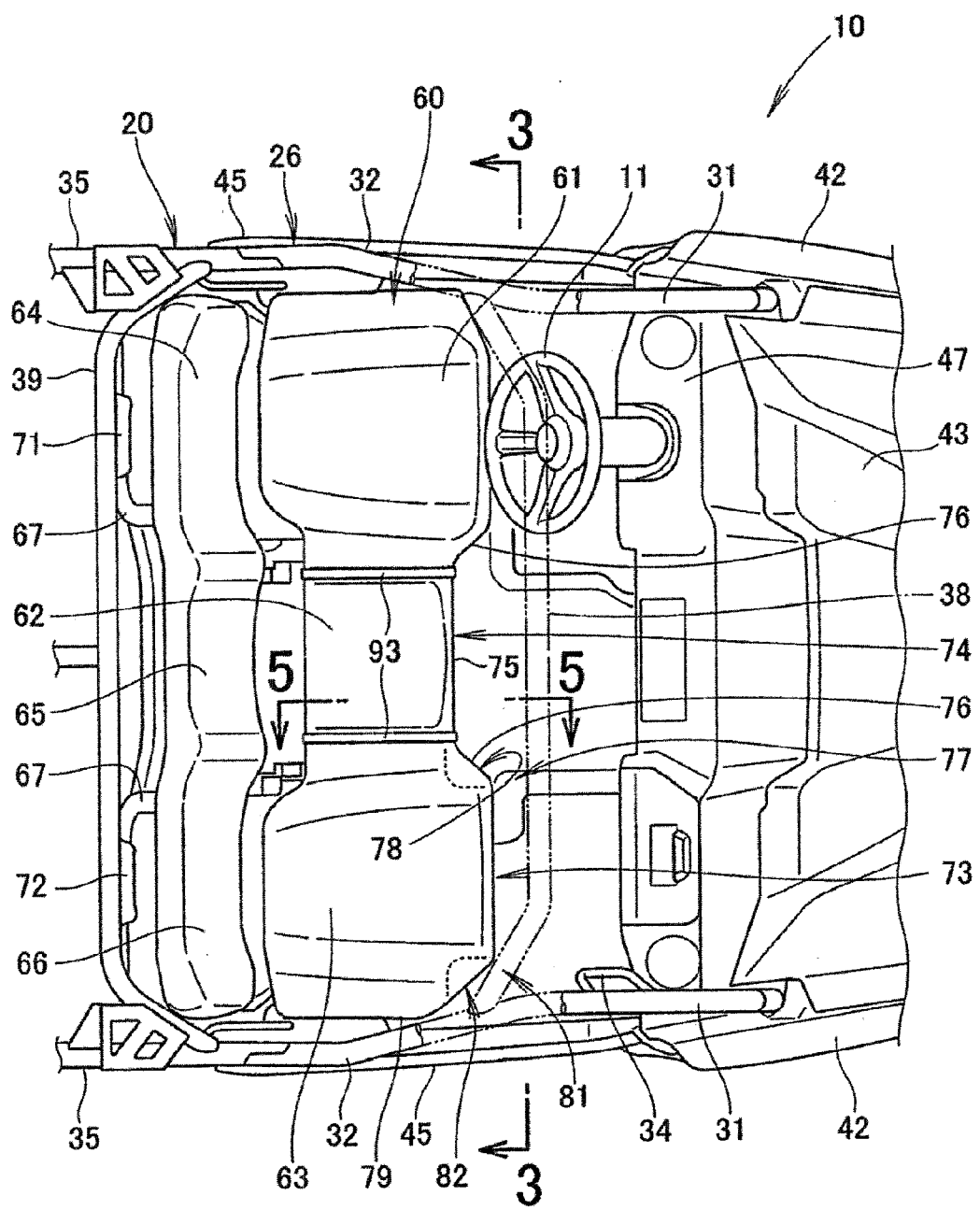
Figure 3:
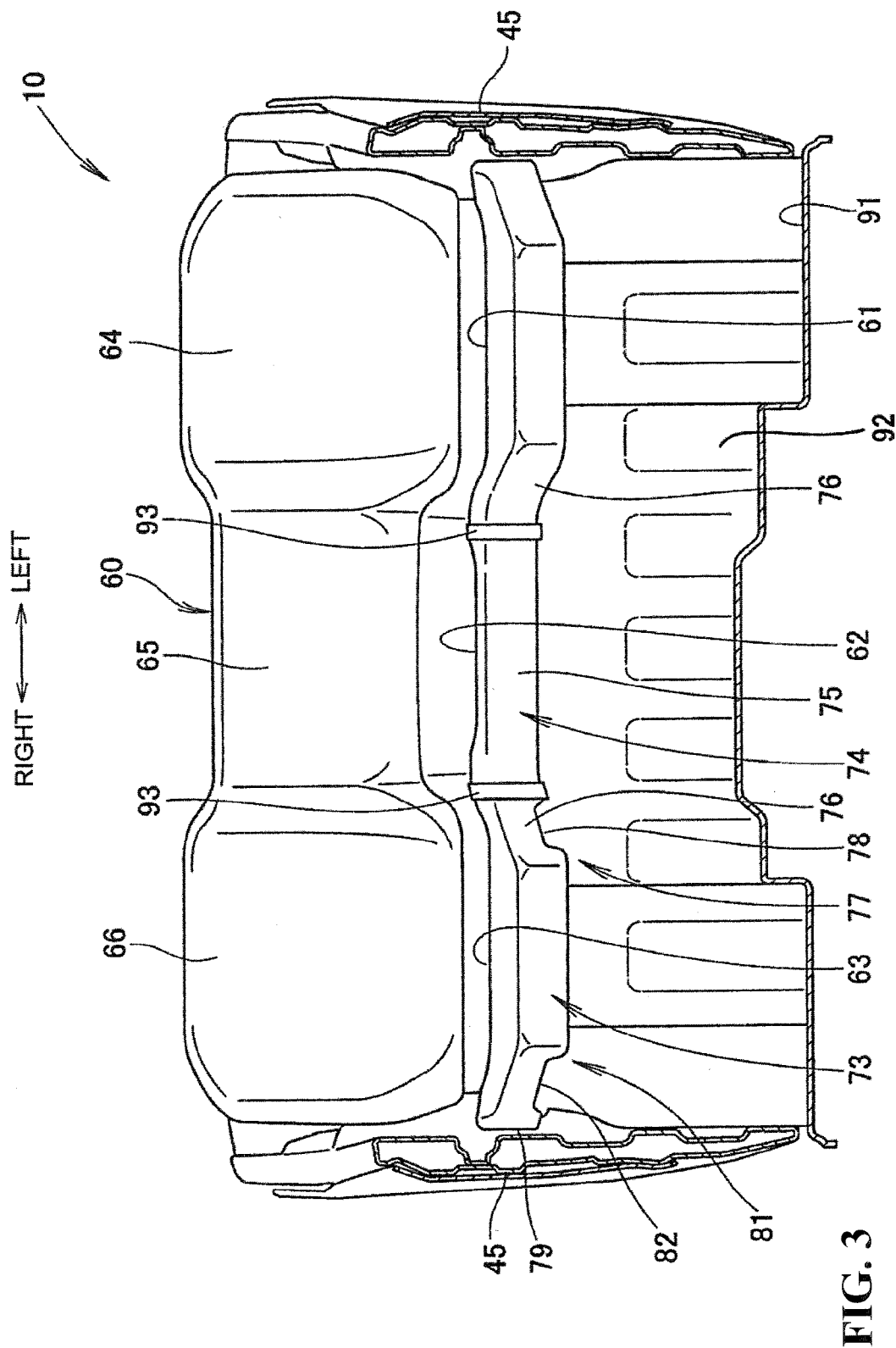
Figure 4:
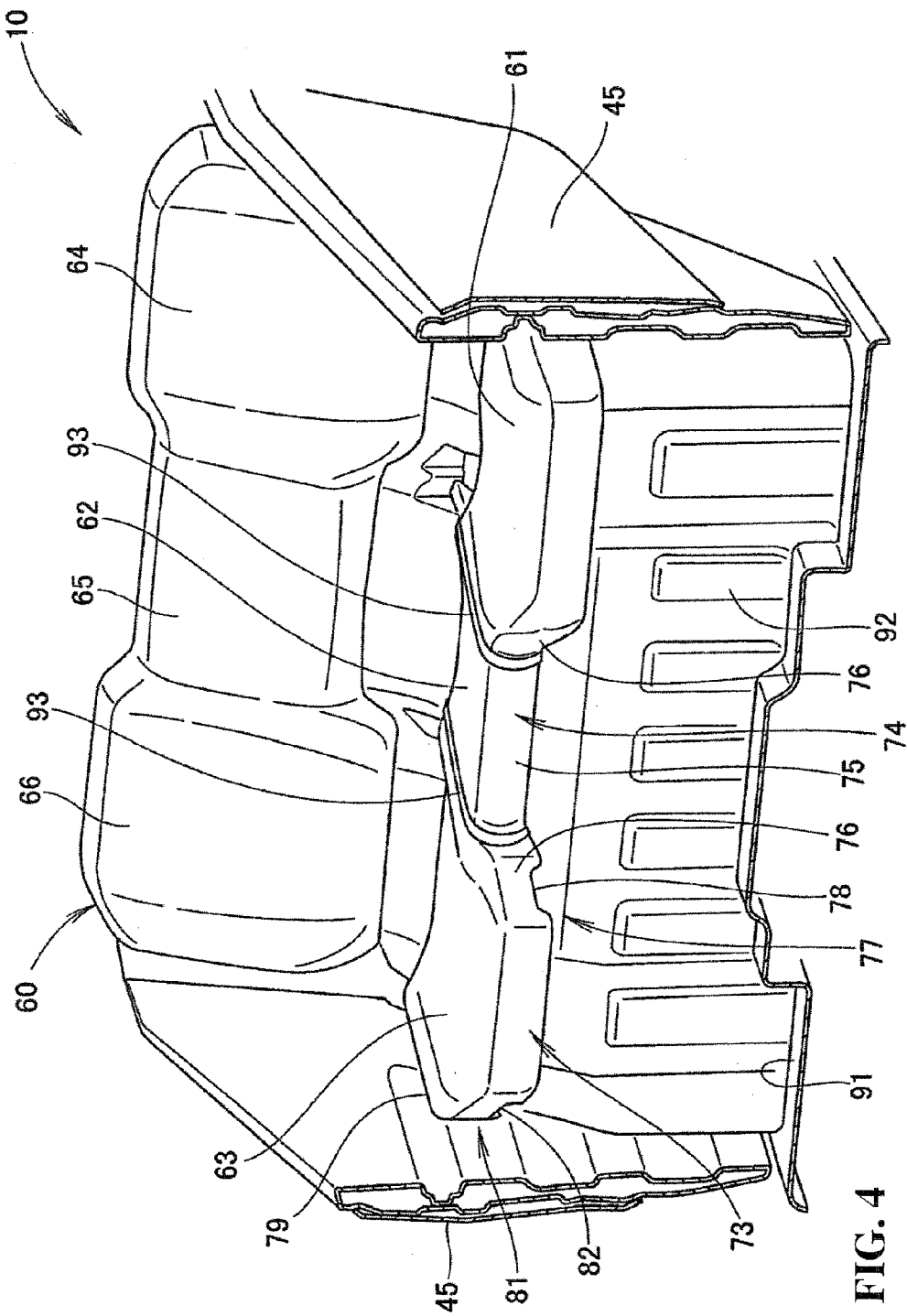
Figure 5:
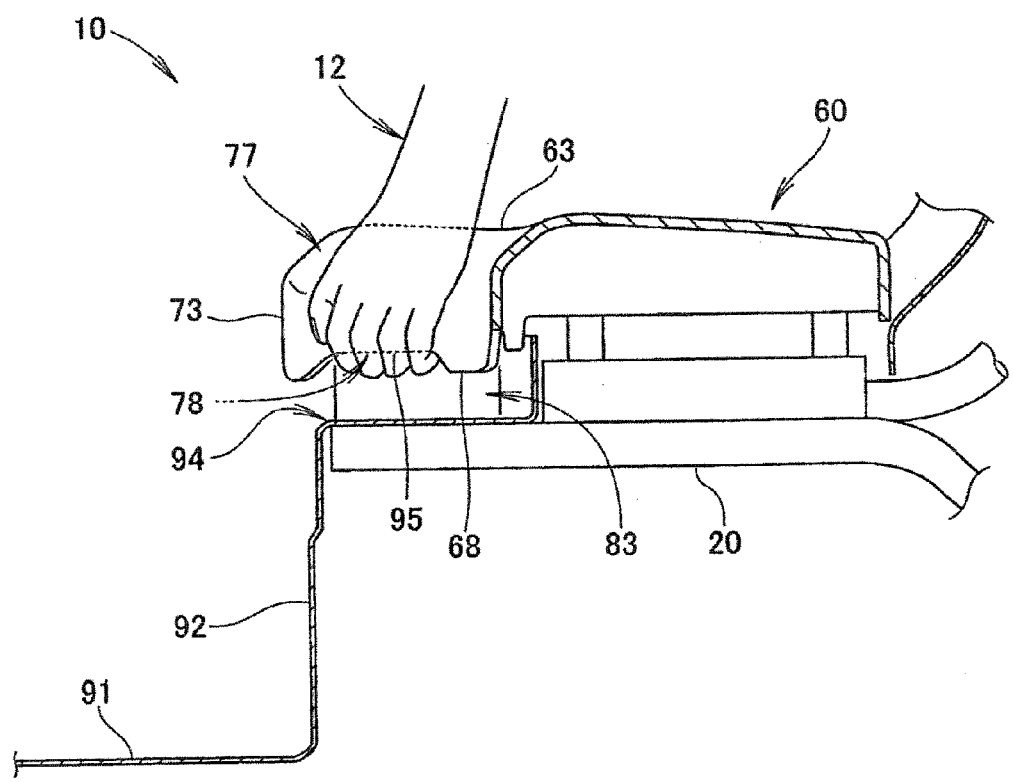
Figure 6:
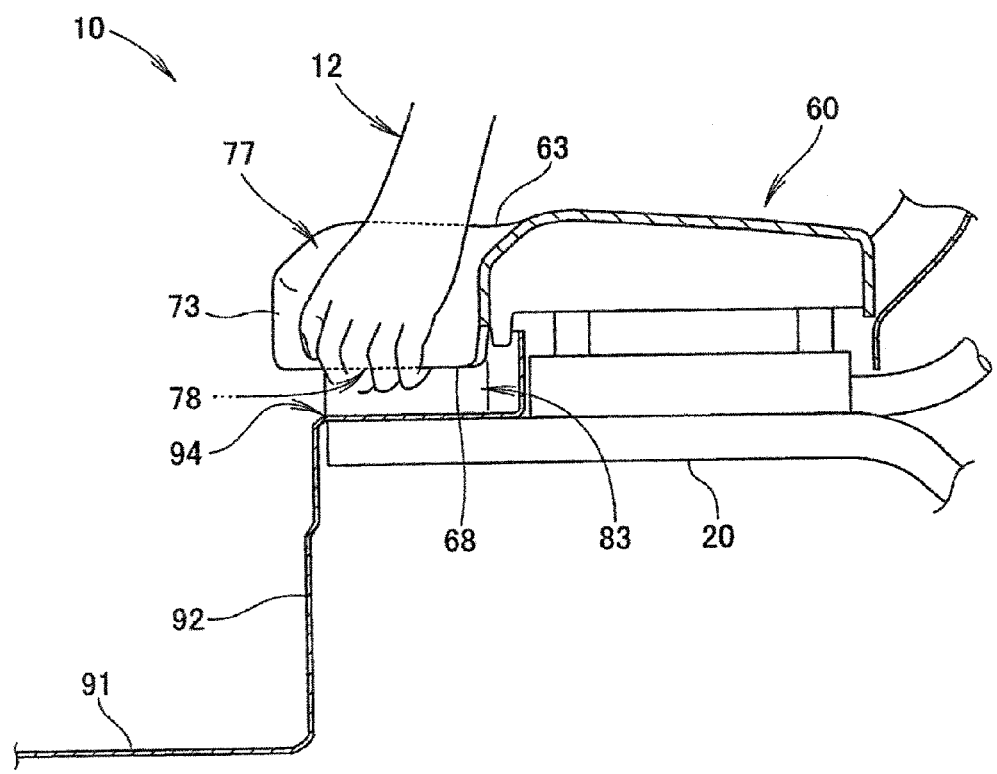
Figure 7:
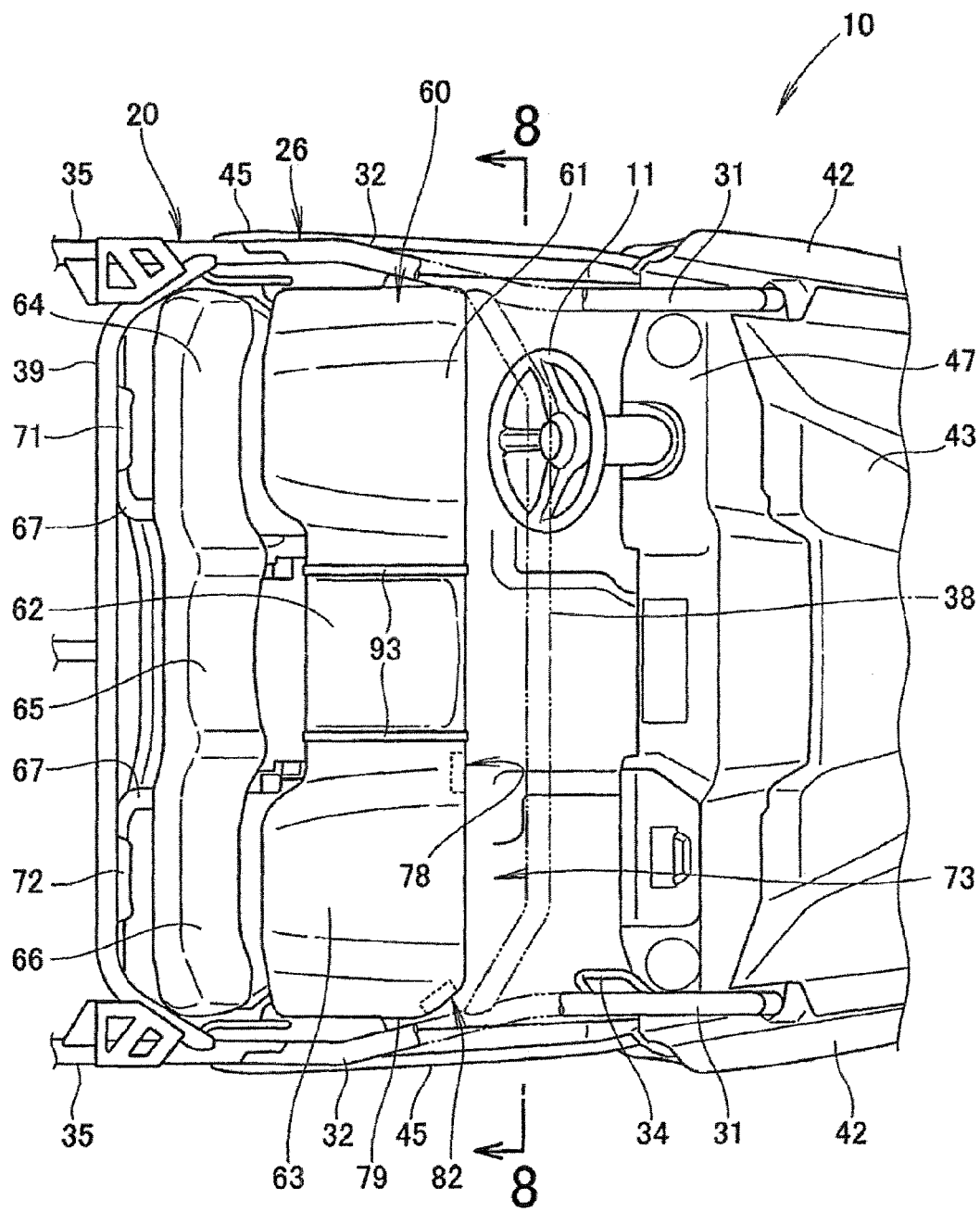
Figure 8:
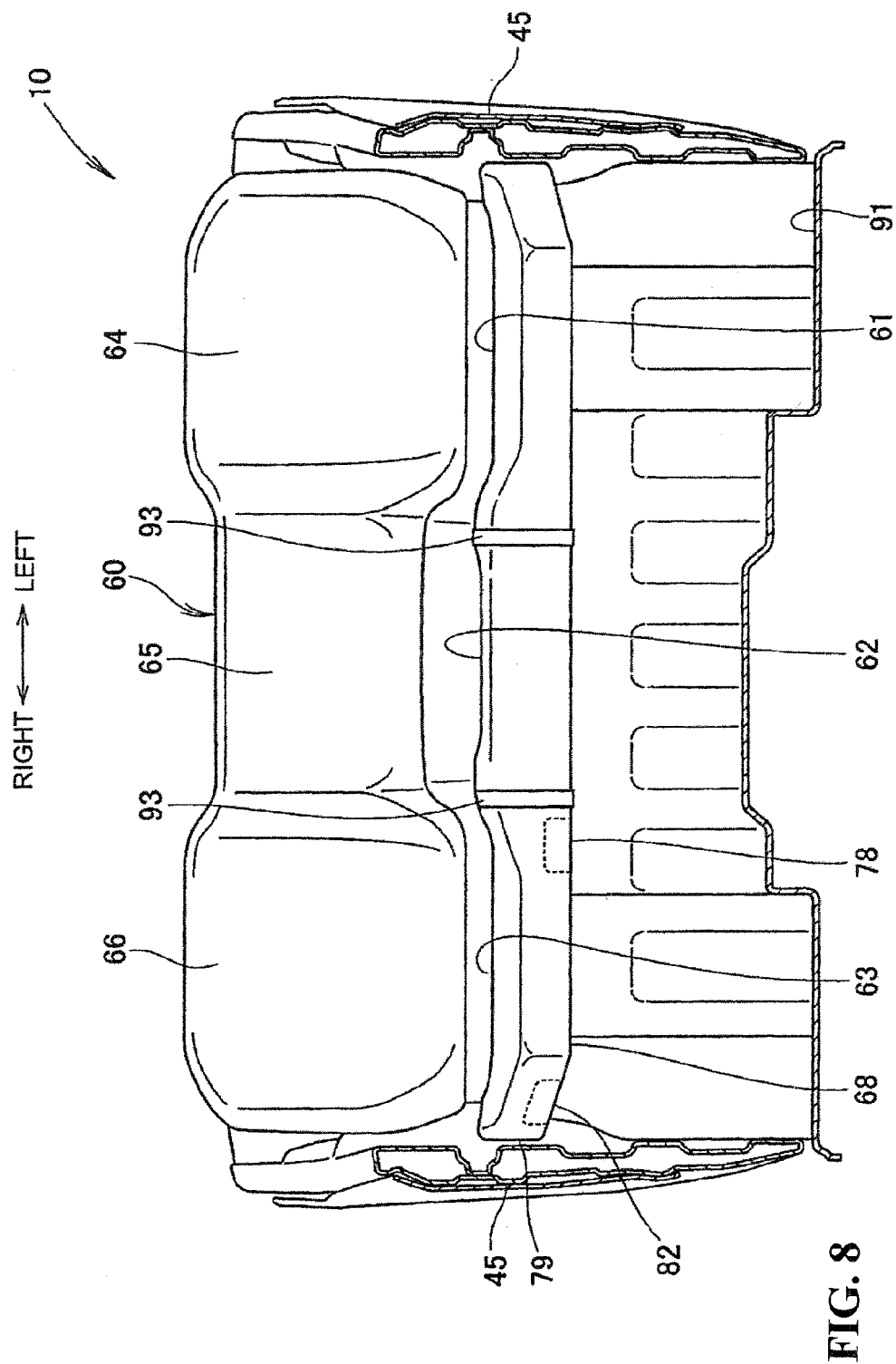

FIG. 1 is a right side view of a vehicle according to the present invention;

FIG. 2 is a plan view of an essential part of the vehicle according to a first preferred embodiment;

FIG. 3 is a cross section taken along the line 3-3 in FIG. 2;

FIG. 4 is a perspective view of the essential part shown in FIG. 3 according to the present invention;

FIG. 5 is a cross section taken along the line 5-5 in FIG. 2;

FIG. 6 is a view similar to FIG. 5, showing a modification;

FIG. 7 is a plan view of an essential part of the vehicle according to a second preferred embodiment; and FIG. 8 is a cross section taken along the line 8-8 in FIG. 7.

MODES FOR CARRYING OUT THE INVENTION

Some preferred embodiments of the present invention will now be described with reference to the attached drawings. The orientation of each drawing is the same as that of reference numerals included therein.

A first preferred embodiment of the present invention will now be described with reference to FIGS. 1 to 6.

Referring to FIG. 1, there is shown a vehicle 10 according to an embodiment of the present invention. The vehicle 10 is a rough-terrain vehicle adapted to be used in a rough terrain. The vehicle 10 is of a four-wheel independent suspension type and has a left steering wheel 11. The vehicle 10 has a body frame 20. A pair of left and right front wheels 21 are independently mounted to the front portion of the body frame 20, and a pair of left and right rear wheels 22 are independently mounted to the rear portion of the body frame 20.

The body frame 20 has a center frame 23 located at a laterally central portion of the vehicle 10 so as to extend in the longitudinal direction of the vehicle 10, a rear frame 24 extending parallel to the center frame 23 thereabove from the central portion to the rear portion thereof, a bumper 25 provided at the front end portion of the center frame 23 for protecting the front portion of the vehicle 10, a front roll bar 26 provided at the front upper portion of the center frame 23 so as to have a substantially archlike shape as viewed in side elevation, and a rear roll bar 27 extending rearwardly from the rear end of the upper portion of the front roll bar 26 so as to have a substantially L-shaped configuration as viewed in a side elevation.

The front portion of the vehicle 10 has a front cover 41 for covering the front end of the vehicle 10, a pair of left and right front fenders 42 provided at the rear portion of the front cover 41 for covering the upper side and rear side of the front wheels 21, a front upper cover 43 provided at the upper portions of the front fenders 42 for covering the front upper portion of the vehicle 10, and a pair of left and right front doors 45 provided at the rear portions of the front fenders 42 so as to be pivotable by hinges 44.

The rear portion of the vehicle 10 has a pair of left and right side covers 46 located on the rear portion of the left and right front doors 45 for covering the left and right sides of the vehicle 10 and a pair of left and right side carrier frames 51 located on the rear upper side of the left and right side covers 46 for forming a carrier 50. Each side carrier frame 51 is composed of a rear door 52 forming a front portion and a rear frame 53 forming a rear portion. Each rear frame 53 is mounted to the body frame 20. Each rear door 52 is pivotably supported through hinges 54 to the front end of the corresponding rear frame 53.

The carrier 50 is supported through stays 55 to the rear frame 24. Each front wheel 21 is supported by a front shock absorber 28, and each rear wheel 22 is supported by a rear shock absorber 29. An instrument panel 47 is provided on the rear side of the front upper cover 43. The steering wheel 11 is located in the vicinity of the instrument panel 47.

The front roll bar 26 has a pair of left and right front pillars 31 extending obliquely upwardly from the upper portions of the left and right front fenders 42 so as to be inclined rearwardly, a pair of left and right front roof side rails 32 extending rearwardly from the upper ends of the left and right front pillars 31, a pair of left and right center pillars 33 extending downwardly from the rear portions of the left and right front roof side rails 32, and a frame grip 34 provided on the right front pillar 31 and adapted to be gripped by a passenger 12.

The rear roll bar 27 has a pair of left and right rear roof side rails 35 extending rearwardly from the upper ends of the left and right center pillars 33, a pair of left and right rear pillars 36 extending downwardly from the rear ends of the left and right rear roof side rails 35, and a top rear cross member 37 extending laterally so as to connect the rear portions of the left and right rear roof side rails 35.

An essential part of the present invention will now be described with reference to FIG. 2.

As shown in FIG. 2, the front roll bar 26 further has a top front cross member 38 extending laterally so as to connect the upper end portions of the left and right front pillars 31 and a top center cross member 39 extending laterally so as to connect the rear portions of the left and right front roof side rails 32.

A seat 60 is provided at the front portion of the vehicle 10. The seat 60 is a single laterally-elongated seat mounted on the body frame 20 and designed so that a plurality of occupants can sit side by side in the lateral direction of the vehicle 10. For example, the seat 60 is a three-occupant seat composed of a left seat portion 61 for a driver, a center seat portion 62 adjacent to the left seat portion 61, and a right seat portion 63 adjacent to the center seat portion 62.

A left seat back 64, a center seat back 65, and a right seat back 66 are provided on the rear side of the left seat portion 61, the center seat portion 62, and the right seat portion 63, respectively. The left seat back 64, the center seat back 65, and the right seat back 66 are integrally formed and arranged side by side in the lateral direction of the vehicle 10. The left seat back 64, the center seat back 65, and the right seat back 66 are supported by a pair of left and right seat back supporting frames 67 constituting the body frame 20. A left headrest 71 and a right headrest 72 are mounted on these seat back supporting frames 67.

The seat 60 has a front end 73 recessed rearwardly at the center seat portion 62 so as to form a substantially U-shaped recess 74 as viewed in a plan view. More specifically, the recess 74 is composed of a bottom portion 75 and a pair of left and right side portions 76 extending obliquely in a forward direction from the left and right ends of the bottom portion 75.

At a left corner portion 77 of the right seat portion 63 where the right side portion 76 of the recess 74 intersects the front end 73 of the right seat portion 63, there is provided a seat grip 78 adapted to be gripped by the occupant (the passenger 12 shown in FIG. 1) sitting on the right seat portion 63. Similarly, a seat grip 82 is provided at a right corner portion 81 of the right seat portion 63 where the front end 73 of the right seat portion 63 intersects a right end 79 thereof.

The seat 60 will now be described in more detail with reference to FIG. 3, which is a front elevation of the seat 60.

As shown in FIG. 3, a floor 91 is provided below the seat 60 to support the feet of the occupants (the driver and the passengers). A vertical wall 92 rises from the floor 91 toward the seat 60. The front end 73 of the seat 60 is positioned on the front side of the vertical wall 92. Accordingly, when the seat grips 78 and 82 are gripped by the passenger 12 sitting on the right seat portion 63, the vertical wall 92 does not interfere with the hands of the passenger 12, so that the passenger 12 can easily grip the seat grips 78 and 82 with his/her hands.

The center seat portion 62 is higher in level than the left seat portion 61 and the right seat portion 63. Accordingly, the occupant 12 sitting on the center seat portion 62 is higher in level than the occupants sitting on the left seat portion 61 and the right seat portion 63, so that interference between the adjacent occupants can be reduced. As a result, good comfort can be obtained even in the case that three occupants sit on the seat 60.

The seat 60 will now be described in more detail with reference to FIG. 4, which is a perspective view of the seat 60.

As shown in FIG. 4, a pair of left and right belts 93 are provided along the left and right sides of the center seat portion 62 so as to extend in the longitudinal direction of the vehicle 10. The left and right belts 93 are adapted to be gripped by the occupant sitting on the center seat portion 62 without twisting his/her hands at the position near his/her body.

The belts 93 are fitted in the recess 74 at the left and right ends of the bottom portion 75. Accordingly, even when the belts 93 are pulled laterally, the lateral movement of the belts 93 can be suppressed by the left and right side portions 76 of the recess 74. As a result, the wearing of the belts 93 on the seat 60 can be reduced to thereby extend the life of the belts 93.

The belts 93 are higher in level than the left seat portion 61 and the right seat portion 63. Accordingly, even when the occupants sit on the left seat portion 61 and the right seat portion 63, there is no possibility that the belts 93 may be hidden by the occupants sitting on the left seat portion 61 and the right seat portion 63. As a result, the occupant sitting on the center seat portion 62 can easily grip the belts 93, thereby maintaining good posture.

Further, the knees of the occupant sitting on the center seat portion 62 are higher in level than the seat grip 78. In addition, the knees of the occupant sitting on the center seat portion 62 do not interfere with the occupant (the passenger 12 shown in FIG. 1) sitting on the right seat portion 63, so that the occupant sitting on the right seat portion 63 can easily grip the seat grip 78, thereby maintaining good posture.

Referring back to FIG. 2, the seat grips 78 and 82 are provided at the corner portions 77 and 81, respectively. More specifically, the front ends of the seat grips 78 and 82 are inclined rearwardly in the longitudinal direction of the vehicle 10. Accordingly, the passenger 12 sitting on the right seat portion 63 can easily grip the seat grips 78 and 82 without twisting his/her hands in the vicinity of his/her body.

The operation or effect of the vehicle 10 described above will now be described with reference to FIG. 5.

As shown in FIG. 5, the front end 73 of the seat 60 is set on the front side of the vertical wall 92 in the longitudinal direction of the vehicle 10. Further, a space 83 is defined between the upper end 94 of the vertical wall 92 and the lower face 68 of the seat 60. Owing to the space 83, the passenger 12 can easily insert his/her hand into the space 83 to firmly grip the seat grip 78.

The seat grip 78 has a substantially U-shaped recess 95. Accordingly, when the passenger 12 grips the seat grip 78 with his/her hand, the hand is fitted in the recess 95, thereby firmly gripping the seat grip 78.

The lower end of the seat grip 78 may be somewhat expanded over the length of the seat grip 78. In this case, the seat grip 78 can be gripped easily. Further, a pipe having a suitable thickness may be provided along the length of the seat grip 78. In this case, the seat grip 78 can be gripped more easily.

A modification of the configuration shown in FIG. 5 will now be described with reference to FIG. 6.

As shown in FIG. 6, the seat grip 78 in this modification has a straight lower end with no recess as viewed in a side elevation. As similar to the configuration shown in FIG. 5, the space 83 is defined between the lower face 68 of the seat 60 and the upper end 94 of the vertical wall 92. According to this modification, the end of the lower face 68 of the seat 60 can be used as the seat grip 78 without the need of any working. As a result, the seat grip 78 can be easily formed and the cost can therefore be reduced.

As shown in FIGS. 1 and 3, the passenger 12 can grip the frame grip 34 with his/her one hand and grip the seat grip 78 with the other hand. As another mode, the passenger 12 can grip the right seat grip 82 with his/her one hand and grip the left seat grip 78 with the other hand. In this manner, the passenger 12 can arbitrarily select the grip according to the circumstances of running of the vehicle 10, thereby maintaining the posture of the passenger 12 at a better condition.

A second preferred embodiment of the present invention will now be described with reference to FIGS. 7 and 8, wherein the same parts as those shown in FIG. 2 are denoted by the same reference numerals and the detailed description thereof will be omitted herein.

As shown in FIG. 7, the front end 73 of the seat 60 is straight in the lateral direction of the vehicle 10. Thus, the front end 73 of the seat 60 can be made simple in shape, so that the manufacturing cost of the seat 60 can be reduced.

The seat grips 78 and 82 are provided on the front end 73 of the right seat portion 63. The seat grips 78 and 82 are located at the positions corresponding to the hands of the passenger sitting on the right seat portion 63 as viewed in plan. Accordingly, the passenger sitting on the right seat portion 63 can grip the seat grips 78 and 82 in the vicinity of his/her body, thereby maintaining good posture.

The seat 60 shown in FIG. 7 will now be described in more detail with reference to FIG. 8, which is a front elevation of the seat 60.

As shown in FIG. 8, the lower face 68 of the seat 60 is straight in the lateral direction of the vehicle 10. Accordingly, the lower face 68 of the seat 60 can be made simple in shape and the manufacturing cost of the seat 60 can therefore be reduced. The seat grips 78 and 82 are formed on the lower face 68 of the seat 60 at the laterally opposite ends of the right seat portion 63. More specifically, the seat grips 78 and 82 can be formed by using the lower face 68 of the seat 60, so that it is unnecessary to provide any additional part on the seat 60 and any special working. As a result, the manufacturing cost of the seat grips 78 and 82 can be reduced.

While the vehicle 10 according to the above preferred embodiments of the present invention is a left-hand drive vehicle, the vehicle 10 may be a right-hand drive vehicle. In this case, the configuration of the vehicle 10 shown may be inverted in the lateral direction of the vehicle 10, thereby obtaining similar effects. Further, the vehicle 10 is not limited to a rough-terrain vehicle, but may be an ordinary-road vehicle.

The vehicle of the present invention is suitably applicable to a vehicle having a single seat designed so that a plurality of occupants can sit side by side in the lateral direction of the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A seat structure for a vehicle having a body frame and a single seat provided on said body frame and designed for positioning a plurality of occupants side by side in a lateral direction of said vehicle, the seat structure comprising:
   a seat grip provided on a lower face of said seat and adapted to be gripped by one of said occupants;
   said seat being a three-occupant seat having a left seat portion, a center seat portion, and a right seat portion;
   one of said left seat portion and said right seat portion is a driver's seat and the other is provided with said seat grip;
   the front end of said seat is locally recessed rearward of said vehicle and forms a substantially U-shaped recess as viewed in a plan view in said seat; and
   said seat grip is provided at a corner portion where said recess intersects the front end of said seat.

2. The seat structure for a vehicle according to claim 1, wherein said body frame is provided with a frame grip adapted to be gripped by one of said occupants; and
   said frame grip is adapted to be gripped by one hand of one of said occupants and said seat grip is adapted to be gripped by the other hand of one of said occupants.

3. The seat structure for a vehicle according to claim 1, wherein a vertical wall rises from a floor toward said seat; and
   a front end of said seat is positioned on the front side of said vertical wall.

4. The seat structure for a vehicle according to claim 3, wherein a space is defined between the lower face of said seat and an upper end of said vertical wall; and
   the edge of said seat is adapted to be gripped by said occupant.

5. The seat structure for a vehicle according to claim 2, wherein a belt is provided along the left or right side of said center seat portion and extends in the longitudinal direction of said vehicle, said belt being adapted to be gripped by said occupant.

6. The seat structure for a vehicle according to claim 2, wherein said center seat portion is higher in level than said left seat portion and said right seat portion.

7. A seat structure for a vehicle having a body frame comprising:
   a single seat mounted on said body frame and designed for positioning a plurality of occupants side by side in a lateral direction of said vehicle, said single seat including a front end recessed rearwardly of said vehicle and forming a substantially U-shaped recess as viewed in a plan view;
   a seat grip provided on a lower face of said seat and adapted to be gripped by an occupant said grip being recessed upwardly;
   said seat grip being provided at a corner portion where said substantially U-shaped recess intersects the front end of said seat;
   said seat is a three-occupant seat having a left seat portion, a center seat portion, and a right seat portion; and
   one of said left seat portion and said right seat portion is a driver's seat and the other is provided with said seat grip.

8. The seat structure for a vehicle according to claim 7, wherein said body frame is provided with a frame grip adapted to be gripped by one of said occupants; and
   said frame grip is adapted to be gripped by one hand of one of said occupants and said seat grip is adapted to be gripped by the other hand of one of said occupants.

9. The seat structure for a vehicle according to claim 7, wherein a vertical wall rises from a floor toward said seat; and
   a front end of said seat is positioned on the front side of said vertical wall.

10. The seat structure for a vehicle according to claim 9, wherein a space is defined between the lower face of said seat and an upper end of said vertical wall; and
the edge of said seat is adapted to be gripped by said occupant.

11. The seat structure for a vehicle according to claim 7, wherein a belt is provided along the left or right side of said center seat portion and extends in the longitudinal direction of said vehicle, said belt being adapted to be gripped by said occupant.

* * * * *